(12) United States Patent
Wheatley et al.

(10) Patent No.: US 11,868,167 B2
(45) Date of Patent: Jan. 9, 2024

(54) AUTOMATICALLY PROVISIONED TAG SCHEMA FOR HYBRID MULTICLOUD COST AND CHARGEBACK ANALYSIS

(71) Applicant: Kyndryl, Inc., New York, NY (US)

(72) Inventors: Keri Wheatley, Austin, TX (US); Omar Odibat, Cedar Park, TX (US); Shikhar Kwatra, San Jose, CA (US); Manish Mahesh Modh, Cedar Park, TX (US); Ilyas Mohamed Iyoob, Pflugerville, TX (US)

(73) Assignee: KYNDRYL, INC., New York, NY (US)

( * ) Notice: Subject to any disclaimer, the term of this patent is extended or adjusted under 35 U.S.C. 154(b) by 120 days.

(21) Appl. No.: 17/304,591

(22) Filed: Jun. 23, 2021

(65) Prior Publication Data

US 2023/0017358 A1 Jan. 19, 2023

(51) Int. Cl.
*G06F 16/00* (2019.01)
*G06F 16/28* (2019.01)
*G06F 16/21* (2019.01)

(52) U.S. Cl.
CPC .......... *G06F 16/285* (2019.01); *G06F 16/212* (2019.01)

(58) Field of Classification Search
None
See application file for complete search history.

(56) References Cited

U.S. PATENT DOCUMENTS

| | | | |
|---|---|---|---|
| 7,533,399 B2 | 5/2009 | Ma | |
| 8,650,194 B2 | 2/2014 | Hu | |
| 9,305,084 B1 * | 4/2016 | McCann | G06F 16/954 |
| 10,235,681 B2 | 3/2019 | Chang | |
| 10,346,621 B2 | 7/2019 | Athulurutlrumala | |
| 10,528,555 B2 | 1/2020 | Bush | |
| 10,872,160 B2 | 12/2020 | Athulurutlrumala | |
| 2011/0246485 A1 * | 10/2011 | Rinearson | G06F 16/907 |
| | | | 707/749 |
| 2012/0041901 A1 * | 2/2012 | Zhao | G06N 5/043 |
| | | | 706/10 |

(Continued)

OTHER PUBLICATIONS

Alonso et al., "Cloud Modernization assessment framework: Analyzing the impact of a potential migration to Cloud," 2013 7th IEEE International Symposium on the Maintenance and Evolution of Service-Oriented and Cloud-Based Systems (MESOCA), Downloaded May 3, 2021, pp. 64-73.

(Continued)

*Primary Examiner* — Hasanul Mobin
(74) *Attorney, Agent, or Firm* — Erik Swanson; Andrew M. Calderon; Calderon Safran & Cole P.C.

(57) ABSTRACT

According to one embodiment, a method, computer system, and computer program product for provisioning a tag schema. The embodiment may include determining data types for tag-keys within an existing ecosystem of tags. Each tag of the existing ecosystem comprises a tag-key and a tag-value. The embodiment may include performing pairwise clustering of the tags within the ecosystem. The embodiment may include identifying a main tag-key within each cluster of tags. The embodiment may include grouping the clusters into a broader category. The embodiment may include providing a tag schema recommendation for the ecosystem based on the grouped clusters.

18 Claims, 5 Drawing Sheets

(56) References Cited

U.S. PATENT DOCUMENTS

| | | | | |
|---|---|---|---|---|
| 2013/0226921 | A1* | 8/2013 | Eliassaf | G06V 30/268 |
| | | | | 707/E17.046 |
| 2016/0147863 | A1* | 5/2016 | Anantharangachar | ........................ |
| | | | | G06F 16/353 |
| | | | | 707/738 |
| 2017/0078138 | A1* | 3/2017 | Arora | G06F 16/285 |
| 2018/0285427 | A1* | 10/2018 | Kaplan | G06F 16/285 |
| 2019/0187156 | A1* | 6/2019 | Quinodoz | G01N 33/58 |
| 2019/0213326 | A1* | 7/2019 | Dykes | G06F 21/552 |
| 2021/0133438 | A1* | 5/2021 | Florencio | G06F 18/41 |
| 2023/0017358 | A1* | 1/2023 | Wheatley | G06F 16/212 |

OTHER PUBLICATIONS

Apptio Cloudability, "Documentation and Best Practices: Learn how to use Cloudability and get the most out of our cloud cost management tool," Accessed: May 3, 2021, Retrieved from the Internet: https://support.cloudability.com/hc/en-us/articles/360004517234-Tag-Explorer, 3 pages.

Apptio, "AWS Tagging Strategy Best Practices," Accessed May 3, 2021, Retrieved from the Internet: https://www.apptio.com/resources/ebooks/aws-tagging-strategy-best-practices/, 2 pages.

Disclosed Anonymously, "Fully Decentralized Cloud using Generalized Trusted Execution Environments and Distributed Hash Tables (Without Blockchain)," IP.com, IP.com No. IPCOM000264923D, IP.com Publication Date: Feb. 5, 2021, 7 pages.

Disclosed Anonymously, "System and Method for Discovery of Multi-Cloud Environments," IP.com, IP.com No. IPCOM000264932D, IP.com Publication Date: Feb. 9, 2021, 9 pages.

Khanna et al., "BROCUR: Distributed Cloud Broker in a Cloud Federation: Brokerage Peculiarities in a Hybrid Cloud," International Conference on Computing, Communication and Automation (ICCCA2015), IEEE, 2015, pp. 729-734.

Mell et al., "The NIST Definition of Cloud Computing", National Institute of Standards and Technology, Special Publication 800-145, Sep. 2011, 7 pages.

Microfocus, "Hybrid Cloud Management X (HCMX)," 2020, Retrieved from the Internet: https://www.microfocus.com/media/data-sheet/hybrid-cloud-management-x-hcmx-ds.pdf, 3 pages.

Mohan, "Dynamic Insertion of Network Devices in Cloud Centric Newtorks," IP.com, IPCOM000212304D, IP Publication Date: Nov. 4, 2011, 9 pages.

Wanless, "Understanding CloudHealth Perspectives," CloudHealth by vmware, Accessed: May 3, 2021, Retrieved from the Internet: https://www.cloudhealthtech.com/blog/understanding-cloudhealth-perspectives, 5 pages.

* cited by examiner

AUTOMATICALLY PROVISIONED TAG SCHEMA FOR HYBRID MULTICLOUD COST AND CHARGEBACK ANALYSIS

BACKGROUND

The present invention relates generally to the field of computing, and more particularly to cloud computing and compute resource management.

Cloud computing is on-demand access, via the internet, to computing resources (e.g., applications, physical servers, virtual servers, data storage, development tools, networking capabilities, etc.) hosted at a remote data center managed by a cloud services provider. The cloud services provider may make these resources available for a monthly subscription fee or may bill them according to usage. The term 'cloud computing' also refers to the technology that makes cloud work. This includes some form of virtualized IT infrastructure—servers, operating system software, networking, and other infrastructure that's abstracted, using special software, so that it can be pooled and divided irrespective of physical hardware boundaries. Virtualization enables cloud providers to make maximum use of their data center resources. Not surprisingly, many corporations have adopted the cloud delivery model for their on-premises infrastructure so they can realize maximum utilization and cost savings, versus a traditional on-premises information technology (IT) infrastructure, and offer the same self-service and agility to their end-users. This model of cloud service is typically referred to as Infrastructure as a Service (IaaS) and is made of highly scalable and automated compute resources. IaaS allows businesses to purchase resources on-demand and as-needed instead of having to buy hardware outright.

SUMMARY

According to one embodiment, a method, computer system, and computer program product for provisioning a tag schema. The embodiment may include determining data types for tag-keys within an existing ecosystem of tags. Each tag of the existing ecosystem comprises a tag-key and a tag-value. The embodiment may include performing pairwise clustering of the tags within the ecosystem. The embodiment may include identifying a main tag-key within each cluster of tags. The embodiment may include grouping the clusters into a broader category. The embodiment may include providing a tag schema recommendation for the ecosystem based on the grouped clusters.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for automatically generating a tag schema recommendation for cloud assets (e.g., compute resources). The following described exemplary embodiments provide a system, method, and program product to, among other things, analyze customer data on existing cloud assets and, accordingly, recommend an overarching tagging governance for the cloud assets. Therefore, the present embodiment has the capacity to improve the technical field of cloud computing and compute resource management by recommending a viable tagging strategy for cloud assets based on analysis of data on existing cloud assets and related tags, dynamically provisioning existing tags as aliases under the new tagging strategy, and optimizing augmentation for tag cleaning, thus enabling a company to perform a more robust level of cost, asset, and security management of their cloud assets. Cost management may relate to cost allocation to cost centers, chargeback reporting, budgeting and forecast spending, and application ownership. Asset management may relate to scheduling, automation scripts, monitoring, and development and IT operations (DevOps). Security management may relate to Health Insurance Portability and Accountability Act (HIPAA) compliance, identity and access management (TAM) user management, monitoring governance, controlling personally identifiable information (PIT), and encryption compliance.

As discussed above, many corporations have adopted the cloud delivery model for their on-premises IT infrastructure. Today, cloud computing is a multibillion-dollar industry with average yearly spending for companies in the tens of millions of dollars. Before this global transformation towards cloud computing and IaaS, a corporation's computing infrastructure was typically managed by a central IT department. Traditionally, the corporation's IT costs and security were tightly managed by a core group of highly knowledgeable, specialized individuals. However, IaaS has enabled a broader range of individuals within organizations to create and manage their own IT infrastructures across disparate departments and for a wide range of use cases from development to production deployment. As cloud asset tagging uses key-value pair labeling, challenges may arise when tags created within one department of an organization (e.g., application development) are consumed within another department (e.g., finance). Since cloud providers do not enforce tagging rules, key-value pairs within a tag ecosystem are often numerous, free-form, and contain "dirty" data (e.g., data containing misspellings, non-uniform use of abbreviations among tag-keys and tag-values, and non-uniform similarities among tag-keys and tag-values). Such key-value pairs (i.e., tags) within an ecosystem are often of no practical value, and may even be a detriment, to an organization's internal reporting needs. Furthermore, a side effect of the transformation towards IaaS has been the increase in sprawl and decentralization of IT cost and security management. Without a traditional central IT infrastructure, companies struggle to control, or budget, their spending on cloud assets. It may therefore be imperative to have a system in place which provides companies with a better understanding of their current use of cloud assets within their IaaS enabled IT infrastructure and begins a process of standardization and creation of an overarching tagging governance of their current and future cloud assets.

According to at least one embodiment, natural language processing and machine learning techniques may be performed on an existing ecosystem of cloud asset tags made up of key-value pairs. A tag type may be determined for each key-value pair and pair-wise clustering is performed on the cloud asset tags. According to at least one embodiment, within each cluster, a main tag-key may be identified as the cluster name and secondary tag-keys are identified as aliases. Tag-keys may be ranked according to a proprietary efficacy score based on tag-key metrics specific to cloud computing tag types such as usage, system entropy, associated asset type/age/cost, and indicators from other users across industry. According to at least one embodiment, clusters may be further grouped into broader logical categories (e.g., Business, Technical, Security) based on a database of industry specific domain knowledge and a recommended tag schema (e.g., top n tags meeting quality criteria) is provided.

Thus, embodiments of the present invention may provide advantages including, but not limited to, performing a more robust level of cost, asset, and security management of cloud assets within an IaaS enabled IT infrastructure, deploying a tag schema for hybrid multi-cloud cost and chargeback analysis using multi-dimensional usage and semantic information, using customer data on existing cloud assets and tags to recommend a viable cloud asset tagging strategy, using a novel fuzzy matching algorithm designed to better match cloud tagging data and the specificities surrounding a particular data type, dynamically provisioning existing tags as aliases under the new tagging strategy, and optimizing augmentation for tag cleaning in based on misspellings, abbreviations, domain knowledge, and information gained. Embodiments of the present invention may also provide the ability to customize the scope and level of groupings according to a user's desired granularity of data, as well as the ability to customize automated acceptance of tag schema suggestions based on the user's tolerance for automation. The present invention does not require that all advantages need to be incorporated into every embodiment of the invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze customer data on existing cloud assets and, accordingly, recommend an overarching tagging governance for the cloud assets.

Figure 1:
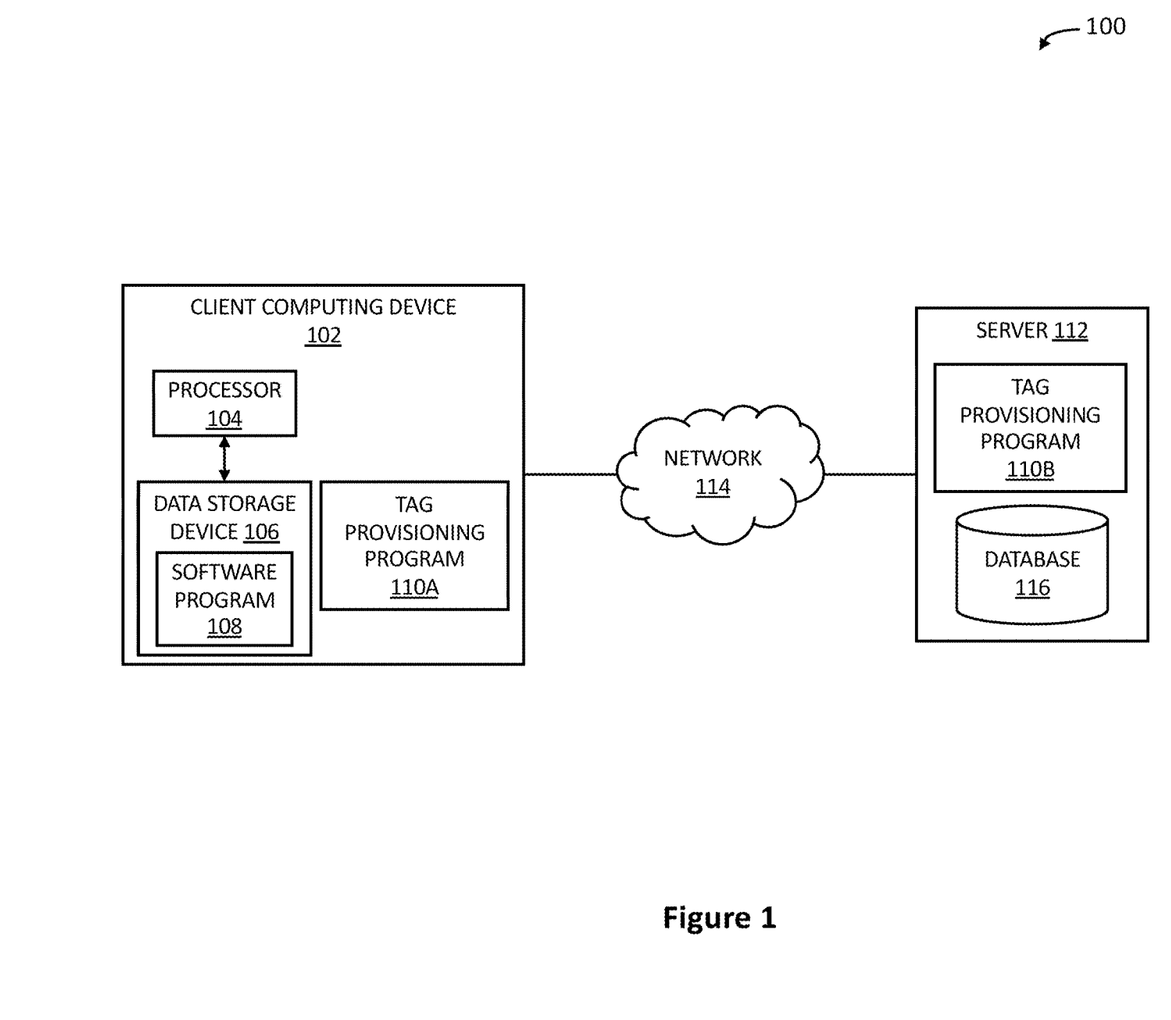
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and server 112 interconnected via a communication network 114. According to at least one implementation, the networked computer environment 100 may include a plurality of client computing devices 102 and servers 112, of which only one of each is shown for illustrative brevity. Additionally, in one or more embodiments, the client computing device 102 and the server 112 may each host a tag provisioning program 110A, 110B. In one or more other embodiments, the tag provisioning program 110A, 110B may be partially hosted on both client computing device 102 and on server 112 so that functionality may be separated among the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a tag provisioning program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a tag provisioning program 110B and a database 116 and communicating with the client computing device 102 via the communication network 114, in accordance with embodiments of the invention. As will be discussed with reference to FIG. 3, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). Moreover, in an IaaS cloud service model, the server 112 may provide virtualized compute resources (i.e., cloud assets) over the internet on demand, on a pay-as-you-go basis. Compute resources may be virtualized infrastructure resources that provide processing capabilities in the cloud by combining CPUs, memory, and disks to create virtual machines. For example, compute resources may include virtual clusters, virtual hosts, virtual resource pools, and virtual disk repositories. Additionally, the server 112 may also be located in a cloud computing deployment model, such as a private cloud, community cloud, public cloud, or hybrid cloud.

According to the present embodiment, the tag provisioning program 110A, 110B may be a program capable of applying natural language pre-processing to both keys and values of tags having key-value pairs, determining a tag type for tags within an existing ecosystem, performing pairwise clustering on tags using various values of each tag pair, identifying a representative or recommended tag for each cluster, grouping the tag clusters into broader categorizations based on industry specific domain knowledge, and providing a tag schema recommendation. The tag provisioning method is explained in further detail below with respect to FIG. 2.

Figure 2:
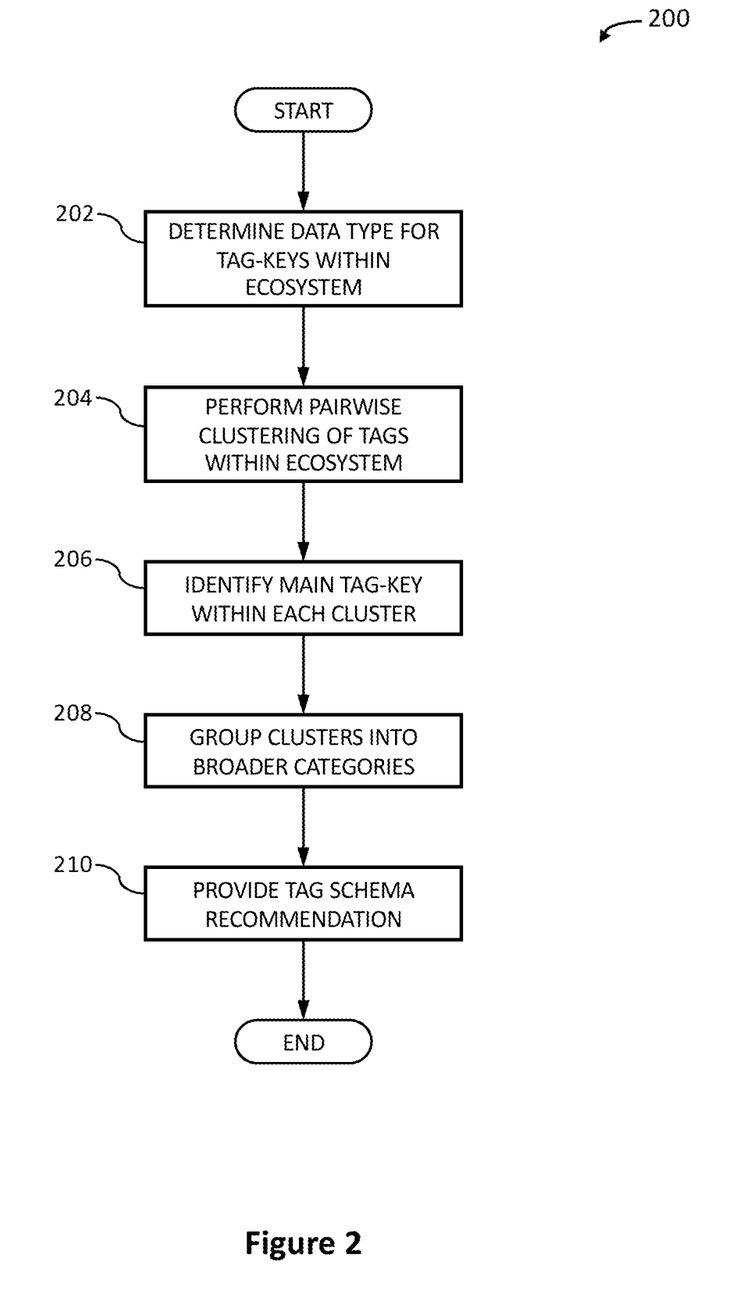
FIG. 2 illustrates an operational flowchart for automatically provisioning a tag schema for cloud assets in a cloud asset management process according to at least one embodiment.

Referring now to FIG. 2, an operational flowchart for automatically provisioning a tag schema for cloud assets in a cloud asset management process is depicted according to at least one embodiment. At 202, the tag provisioning program 110A, 110B determines a data type for tag-keys within an existing ecosystem of cloud assets having tag information which includes a tag-key and a tag-value (i.e., a key-value pair). Prior to determining the tag-key data types, the tag provisioning program 110A, 110B may apply known natural language processing (NLP) techniques to both the tag-key and the-tag value of each tag identified within the ecosystem so as to place the tags in a uniform format for further processing by the tag provisioning program 110A, 110B. For example, NLP techniques such as, but not limited to, stemming and lemmatization may be applied to tag-keys and tag-values. As another example, NLP techniques may be applied to remove special characters or dashes from tag-keys and tag-values, or to make text case uniform (e.g., all lowercase) among tag-keys and tag-values. These examples of NLP pre-processing are for illustration only and are not meant to limit the application of NLP techniques by the tag provisioning program 110A, 110B.

With continued reference to step 202, having placed the tags in a uniform format, the tag provisioning program 110A, 110B may proceed to determine an overall data type (e.g., float, enum, string, timestamp, email) for each tag-key within the ecosystem. According to at least one embodiment, a tag-key is a category header under which tag-values are organized. The tag provisioning program 110A, 110B may determine a tag-key data type based on analysis of the tag-values organized under it. Such analysis of the tag-values may incorporate the application of NLP techniques, a rules-based approach, and/or deep learning to determine a format of the tag-values. As an example, consider a tag-key of "Owner_Email" having the following associated tag-values: j.doe@ibm.com; gjones@ibm.com; fredwaslk@ibm.com; fran_jean_ibm.com; and klau_ibm.com. In this example, analysis of the tag-values may result in the data type mappings of email, email, email, string, and string, respectively. Using the data types determined for each tag-value, the tag provisioning program 110A, 110B may associate the tag-key with an overall data type of email. The tag provisioning program 110A, 110B may then record the data type, email, associated with the tag-key, "Owner_Email", as the tag-type and discard the data type mappings for the tag-values. According to another embodiment, thresholds may be established by a system administrator to account for how many times differing data type mappings are determined. For instance, if the data type mappings of int, string, and email are determined for a group of tag-values, the tag provisioning program 110A, 110B may record the data type, string, as the tag-type for the group regardless of how many times the data type mapping, string, appears (i.e., is determined) in the group. As will be further discussed below, determining tag-key data types will enable a more efficient and accurate process for fuzzy matching between tag-keys and between tag-values.

Then, at 204, the tag provisioning program 110A, 110B performs pairwise clustering of the tags within the ecosystem based on analysis of tag-keys and tag-values. More specifically, the tag provisioning program 110A, 110B may cluster pairs of tags based on clustering metric values resulting from 1) comparison of tag-key data types, 2) assessment of tag-key name to tag-key name similarity using fuzzy matching between the name strings to calculate a score between 0 and 1, 3) evaluation of patterns of tag-values used across assets, and 4) assessment of tag-value to tag-value similarity using fuzzy matching or another function. Each of the above clustering metric values may be measured against a respective threshold value defined by a system administrator.

1) Comparison of tag-key data types—When comparing tag-key data types of two tags, tags whose tag-key data types are the same may result in a value of 1 for the comparison. Tags whose tag-key data types are different may result in a value of 0 for the comparison. According to one embodiment, tag-keys having different data types may not be clustered together and the tag provisioning program 110A, 110B may not determine the remaining clustering metric values. According to another embodiment, a tag-key data type comparison value of 0 may not be dispositive of clustering and may be factored in with the other clustering metric values (e.g., may be part of a weighted average/scoring of the clustering metric values).

2) Assessment of tag-key name to tag-key name similarity—In assessing/calculating the similarity between two tag-key names, the tag provisioning program 110A, 110B may utilize a novel fuzzy matching algorithm such as illustrated in the example pseudocode below:

```
Input: strings s1 and s2
Score = 0
Itr_no = 0
While len(LCS(s1, s2)) > 0
    weight = (2 * Len(LCS)) / (len(s1) + len(s2))
    penalty based on distance (p1) = 1 - abs(indx1 - indx2) / (len(s) + len(s2))
    penalty based on iteration number (p2) = len(s1) / (len(s1) + itr_no)
    Score = Score + weight * p1 * p2
    Itr_no = Itr_no + 1
    Replace LCS in s1 with special characters // e.g., "#" to avoid
    duplication
Output Score
```

In the above pseudocode, len is a text function that returns the length of a string, LCS is the longest common subsequence between string $s_1$ and string $s_2$, abs is a function which returns the absolute value of a number, indx1 is the location index of the longest common subsequence in string $s_1$, and indx2 is the location index of the longest common subsequence in string $s_2$. It should be noted that this is an iterative algorithm and consequently in each iteration there may be a different longest common subsequence between strings $s_1$ and $s_2$. As such, the values of indx1 and indx2 may change over different iterations. It should also be noted that the novel fuzzy matching algorithm above is typically implemented in two rounds so that the order of the strings may be switched. For example, given two strings, "productionprd" and "production", during the first round string $s_1$=productionprd and string $s_2$=production; during the second round string $s_1$=production and string $s_2$=productionprd.

The following may serve as an illustrative example of the novel fuzzy matching algorithm implemented with the strings "productionprd" and "production":

Round:1, string s1 = productionprd, string s2 = production
Score=0
Itr_no=0 This is iteration number 0

First, we calculate LCS (longest common subsequence) between the two strings, in this example, it is "production"

```
LCS(s1,s2)="production"
Len(LCS(s1,s2))=length("production")=10
Len(s1)=length("productionprd")=13
Len(s2)=length("production")=10
Indx1=1
Indx2=1
Weight= 2*len(LCS)/(len(s1)+len(s2))
       =2*10/(13+10)=0.8696
P1= 1- abs(indx1-indx2)/(len(s1)+len(s2))
   =1-abs(1-1)/(10+13)=1-0/23=1-0=1.0
P2=len(s1)/(len(s1)+iter_no)
P2=(13/13)=1.0
Score= score+Weight*p1*p2
      =0+0.8696*1.0*1.0
      =0.8696
```

After this iteration, iteration number will be incremented by 1 as seen by:

$Itr\_no = itr\_no + 1 = 0 + 1 = 1$

The LCS may then be replaced with special character "#" in $s_1$. Now $s_1$ and $s_2$ may be represented as s1="##########prd" and s2="production" and the formula may be:

```
LCS(s1="##########prd", s2= "production")="pr"
Len(LCS(s1,s2))=2
Weight= 2*len(LCS)/(len(s1)+len(s2))
       =2*2/(13+10)=4/23=0.174
Indx1=11
Indx2=1
P1= 1- abs(indx1-indx2)/(len(s1)+len(s2))
  = 1-abs(11-1)/(13+10)
  =1-10/23=0.565
P2=len(s1)/(len(s1)+iter_no)
  =13/14=0.92857
Score= score+Weight*p1*p2
      =0.8696+0.174*0.565*0.93 // 0.8696 was from the previous iteration
      =0.8696+0.0913
      =0.9609
```

After this iteration, iteration number will be incremented by 1 as seen by:

$Itr\_no = itr\_no + 1 = 1 + 1 = 2$

The LCS may then be replaced with special character "#" in $s_1$. Now $s_1$ and $s_2$ may be represented as s1="############d" and s2="production" and the formula may be:

```
LCS(s1="############d", s2= "production")="d"
Len(LCS(s1,s2))=1
Indx1=13
Indx2=4
Weight= 2*len(LCS)/(len(s1)+len(s2))
       =2*1/(13+10)=2/23=0.0869
P1= 1- abs(indx1-indx2)/(len(s1)+len(s2))
   =1-abs(13-4)/(10+13)=1-9/23=0.6087
P2=len(s1)/(len(s1)+iter_no)
P2=13/(13+2)=13/15=0.8667
Score= score+Weight*p1*p2
      =0.9609+0. 0869*0.6087*0.8667 // 0.9609 was from the previous iteration
```

```
=0.9609+0.045845
=1.00675
```

Round:2, string s1 = production, string s2 = Productionprd
Score=0
Itr_no=0

First, the LCS may be calculated as the longest common subsequence between the two strings. In this example, it is "production" as seen by:

```
LCS(s1,s2)="production"
Len(LCS(s1,s2))=length("production")=10
Len(s1)=length("production")=10
Len(s2)=length("productionprd")=13
Indx1=1
Indx2=1
Weight= 2*len(LCS)/(len(s1)+len(s2))
       =2*10/(10+13)=20/23=0.8696
P1= 1- abs(indx1-indx2)/(len(s1)+len(s2))
   =1-abs(1-1)/(10+13)=1-0/23=1-0=1.0
P2=len(s1)/(len(s1)+iter_no)
P2=(13/13)=1.0
Score= score+Weight*p1*p2
      =0.8696
```

After this iteration, iteration number will be incremented by 1 as seen by:

$Itr\_no = itr\_no + 1 = 0 + 1 = 1$

The LCS may be replaced with special character "#". Now $s_1$ and $s_2$ may be represented as s1="##########" and s2="productionprrd" and the formula may be:

```
LCS(s1="##########", s2= "productinoprd")=""
Len(LCS(s1,s2))=0  →We stop here since there is no longer a LCS
Therefore, the score from the second round is 0.8696
```

The score from round 1 and round 2 may be combined into the final score as follows:

Final score=((score from round 1)*(length of string 1 in round 1)+(score from round 2)*(length of string 1 in round 2))/(len(s1)+len(s2))=
(1.00675*13+0.8696*10)/(13+10)=(13.08775+ 8.696)/23=21.784/23=0.947

The fuzzy matching algorithm implemented in embodiments of the invention may extend on known fuzzy matching methods (e.g., the Levenshtein Distance method) by being customized to fit the structure and the nature of the tag data, and therefore may result in increased accuracy in fuzzy matching of tag-key names despite the presence of dirty data (e.g., abbreviations, typos). The iterative approach and changing LCS analysis of the disclosed fuzzy matching algorithm recognizes and quantifies the significance of repeated letters between two tag-key names. For instance, the similarity between the tag-key names "production" and "productionprd" will be scored higher, and be more meaningful, than the similarity between the tag-key names "production" and "productionxyz" since the tag-key names "production" and "productionprd" repeat more letters between them.

3) Evaluation of patterns of tag-values used across assets—In evaluating patterns of tag-values used across assets, the tag provisioning program 110A, 110B may utilize text vectorization and known unsupervised learning methods such as k-means clustering and density-based spatial clustering to output a value which quantifies a similarity between tag-values and potentially indicates a clustering. As an illustration, consider Table 1 below:

TABLE 1

| Tag-key | Asset 1 Tag-value | Asset 2 Tag-value | Asset 3 Tag-value | Asset 4 Tag-value |
|---|---|---|---|---|
| bu | ecom | tele | mobi | |
| project | ecom | | mobi | csto |
| ENV | dev | test | tst | prod |
| owner | Jjohn | | s_devoir | |

Despite the apparent difference in the tag-keys "bu" and "project" of Table 1, unsupervised learning methods of the tag provisioning program 110A, 110B may nevertheless output a value which indicates that "bu" and "project" should be grouped together since multiple assets (i.e., asset 1 and asset 3) have similar tag-values (i.e., "ecom" and "mobi").

4) Assessment of tag-value to tag-value similarity—In assessing/calculating the similarity between two tag-values, the tag provisioning program 110A, 110B may utilize the novel fuzzy matching algorithm above or another function (e.g., an exact function, an error function). The method by which the tag provisioning program 110A, 110B assesses/calculates the similarity between two tag-values may depend on the determined overall data type of the tag-keys. For example, tag-values organized under a tag-key mapped to a data type of enum, such as "Business_Unit", may be compared against each other using the computationally expensive fuzzy matching algorithm proposed above. Tag-values organized under a tag-key mapped to a data type of string may also be compared against each other using the fuzzy matching algorithm proposed above plus the use of word embedding. On the other hand, tag-values organized under a tag-key mapped to a data type of timestamp, such as "Creation_Date", may have a different processing for similarity matching that does not utilize the proposed process of fuzzy matching since a fuzzy match for a timestamp data type may not be accepted as a valid match. Moreover, according to at least one embodiment, tag-values organized under a tag-key mapped to a number data type (e.g., int, float) may also have a different processing for similarity matching that does not utilize the proposed fuzzy matching algorithm. In cases where a tag-key is mapped to a number data type, the process for similarity matching between tag-values may include the use of an error function (e.g., look to see if the tag-value is outside of a determined range).

Next, at 206, the tag provisioning program 110A, 110B may identify a main tag-key and alias tag-keys for each cluster of tags. The identification of the main tag-key and alias tag-keys for a cluster may be based on respective metrics of the tag-keys such as %_tagged, norm_entropy, and #_unique. Furthermore, the tag provisioning program 110A, 110B may also calculate an efficacy score for each tag-key based on its respective metrics (e.g., %_tagged, norm_entropy, and #_unique). The tag-key with the highest calculated efficacy score may be identified as the main tag-key for the cluster while the remaining tag-keys may each be identified as an alias tag-key for the cluster. According to at least one embodiment, % tagged may represent the percentage of tagged assets which have tag-value organized under a particular tag-key. Norm_entropy may represent a normalized value, between 0 and 1, using Shannon's entropy for a particular tag-key. Entropy is a value for orderliness and disorderliness within the ecosystem. A high entropy value for a tag-key may indicate that there are too many options within that tag-key, therefore, it is desirable to select a tag-key having a low entropy value as this would indicate a more meaningful (i.e., more useful in business intelligence reporting) tag-key. However, it should be noted that a entropy value of zero would not be desirable as this would indicate that there are no options within that tag-key. The tag metric, #_unique, may represent the count of how many unique values (e.g., tag-values) organized under a particular tag-key. A tag-key having a low #_unique value (e.g., 1) may not be desirable as that would be indicative of an obvious misspelling or a one-off key-value pair. According to at least one embodiment, the tag provisioning program 110A, 110B may combine and/or mathematically manipulate the above metrics (e.g., %_tagged, norm_entropy, and #_unique) for each tag-key in order to determine an efficacy score for each tag-key within a cluster. Examples of mathematical manipulations may include multiplying the tag-key metrics together, dividing the tag-key metrics by each other, and/or applying square root or exponential transformations to the tag-key metrics. The determined efficacy scores may also define a ranking of the tag-keys within the cluster.

The following table provides an example of tag-key clusters with an identified main tag-key and one or more alias tag-keys for each cluster, along values for their respective tag-key metrics and efficacy scores, as output by the tag provisioning program 110A, 110B:

TABLE 2

| tag_key | %_tagged | norm_entropy | #_unique | score |
|---|---|---|---|---|
| Environment | 0.53 | 0.211 | 15 | 7 |
| Envrionment | 0.0001 | 0 | 1 | 0 |
| Environemnt | 0.0001 | 0 | 1 | 0 |
| Enviornment | 0.0001 | 0 | 1 | 0 |
| bu | 0.265 | 0.267 | 81 | 4 |
| project | 0.214 | 0.261 | 81 | 3 |
| Requester | 0.543 | 0.557 | 231 | 3 |
| requester | 0.003 | 0.86 | 7 | 1 |
| Requster | 0.0001 | 0 | 1 | 0 |
| Requeser | 0.0001 | 0 | 1 | 0 |
| requestor | 0.0001 | 0 | 1 | 0 |

As can be seen in Table 2, the tag-keys "Environment", "Envrionment", "Environemnt", and "Enviornment" have been clustered together with the tag-key "Environment" being identified (e.g., underlined) as the main tag-key for the cluster and having the highest efficacy score. The remaining tag-keys within the cluster, namely, "Envrionment", "Environemnt", and "Enviornment", may be identified as alias (i.e., secondary) tag-keys for the cluster. Also shown in Table 2, the tag-keys "bu" and "project" have been clustered together with the tag-key "bu" being identified as the main tag-key for the cluster and having the highest efficacy score. The remaining tag-key within the cluster, "project", may be identified as an alias tag-key for the cluster. The grouped ranking of tag-keys shown in Table 2 may provide a user of the tag provisioning program 110A, 110B smarter groupings and a birds-eye view of the tag ecosystem.

Next, at 208, the tag provisioning program 110A, 110B may categorize the tag clusters determined at step 204 into broader categorizations such business, technical, and security. More specifically, the tag provisioning program 110A, 110B may categorize tag-keys of each cluster into one of the three broader categories above. Tag-keys categorized within the business category may relate to cost and chargeback reporting. Tag-keys categorized within the technical and security categories may relate to asset management. In organizing the tag-keys into one of these three broader categories, the tag provisioning program 110A, 110B may provide a user with more meaningful insight for their business intelligence reporting and may provide the user with smarter optimization for tag schema creation. The tag provisioning program 110A, 110B may categorize the tag-keys into one of the three broader categories above based on industry specific domain knowledge (e.g., best practices, industry specific recommendations) stored within database 116 as a repository of common mappings.

The following table provides an example of possible output of the tag provisioning program 110A, 110B after performing steps 202-208:

TABLE 3

| category | tag_key | key-type | example_value | %_tagged | norm_entropy | #_unique | score |
|---|---|---|---|---|---|---|---|
| Business | Gov | enum | serv | 0.135 | 0.018 | 3 | 9 |
| Business | Opco | enum | EVM1 | 0.705 | 0.166 | 16 | 9 |
| Business | Cartesis | enum | SVT | 0.538 | 0.34 | 35 | 6 |
| Business | bu | enum | ecom | 0.265 | 0.267 | 81 | 4 |
|  | project | enum | mobi | 0.214 | 0.261 | 81 | 3 |
| Technical | Service | enum | mssql | 0.708 | 0.162 | 11 | 9 |
| Technical | Environment | enum | dev | 0.53 | 0.211 | 15 | 7 |
|  | Environment | enum | development | 0.0001 | 0 | 1 | 0 |
|  | Environment | enum | prod | 0.0001 | 0 | 1 | 0 |
|  | Environment | enum | Prod | 0.0001 | 0 | 1 | 0 |
| Technical | validation | enum | Trunc | 0.12 | 0.086 | 9 | 5 |
| Technical | OS | string | linux | 0.18 | 0.305 | 21 | 3 |
| Security | Requester | Email | Ben.Nates@ibm.com | 0.543 | 0.557 | 231 | 3 |
|  | requester | email | romulo.juhn@ibm.com | 0.003 | 0.86 | 7 | 1 |
|  | Requester | email | Brian.gilds@ibm.com | 0.0001 | 0 | 1 | 0 |
|  | Requester | email | Ravi.venu@ibm.com | 0.0001 | 0 | 1 | 0 |
|  | requestor | email | steve.fev@ibm.com | 0.0001 | 0 | 1 | 0 |

Next, at step 210, the tag provisioning program 110A, 110B may recommend a tag schema. According to at least one embodiment, the recommended tag schema may include a subset of the highest quality tags (e.g., a subset of tag-keys with the highest efficacy scores, a subset of tag-keys with efficacy scores which exceed a threshold value) resulting from execution of steps 202-208. According to another embodiment, the recommended tag schema may include all of the results from execution of steps 202-208.

It may be appreciated that FIG. 2 provides only an illustration of one implementation and do not imply any limitations with regard to how different embodiments may be implemented. Many modifications to the depicted environments may be made based on design and implementation requirements.

Figure 3:
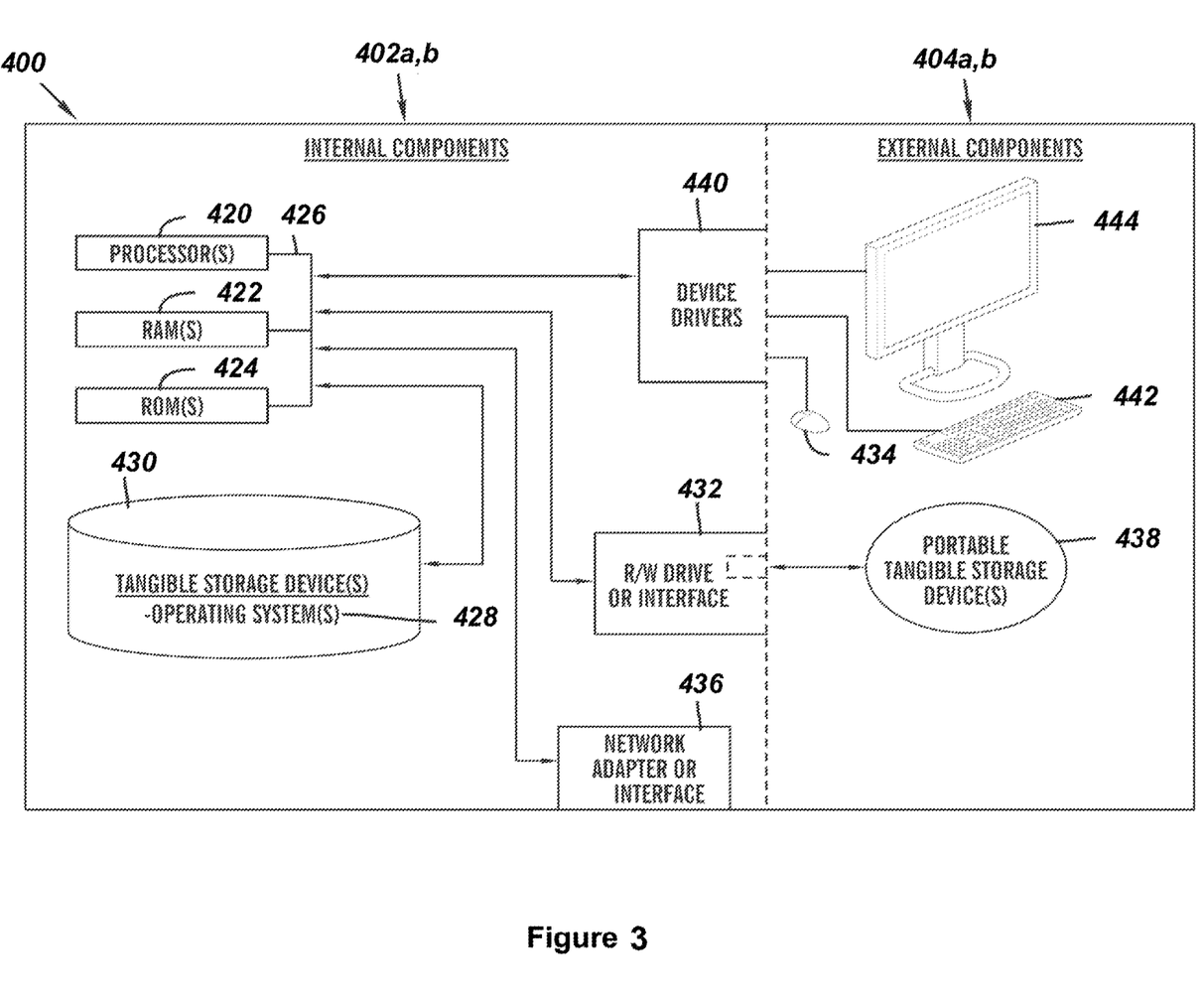
FIG. 3 is a functional block diagram of internal and external components of computers and servers depicted in FIG. 1 according to at least one embodiment.

FIG. 3 is a block diagram 400 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the tag provisioning program 110A in the client computing device 102 and the tag provisioning program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the tag provisioning program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the tag provisioning program 110A in the client computing device 102 and the tag provisioning program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the tag provisioning program 110A in the client computing device 102 and the tag provisioning program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
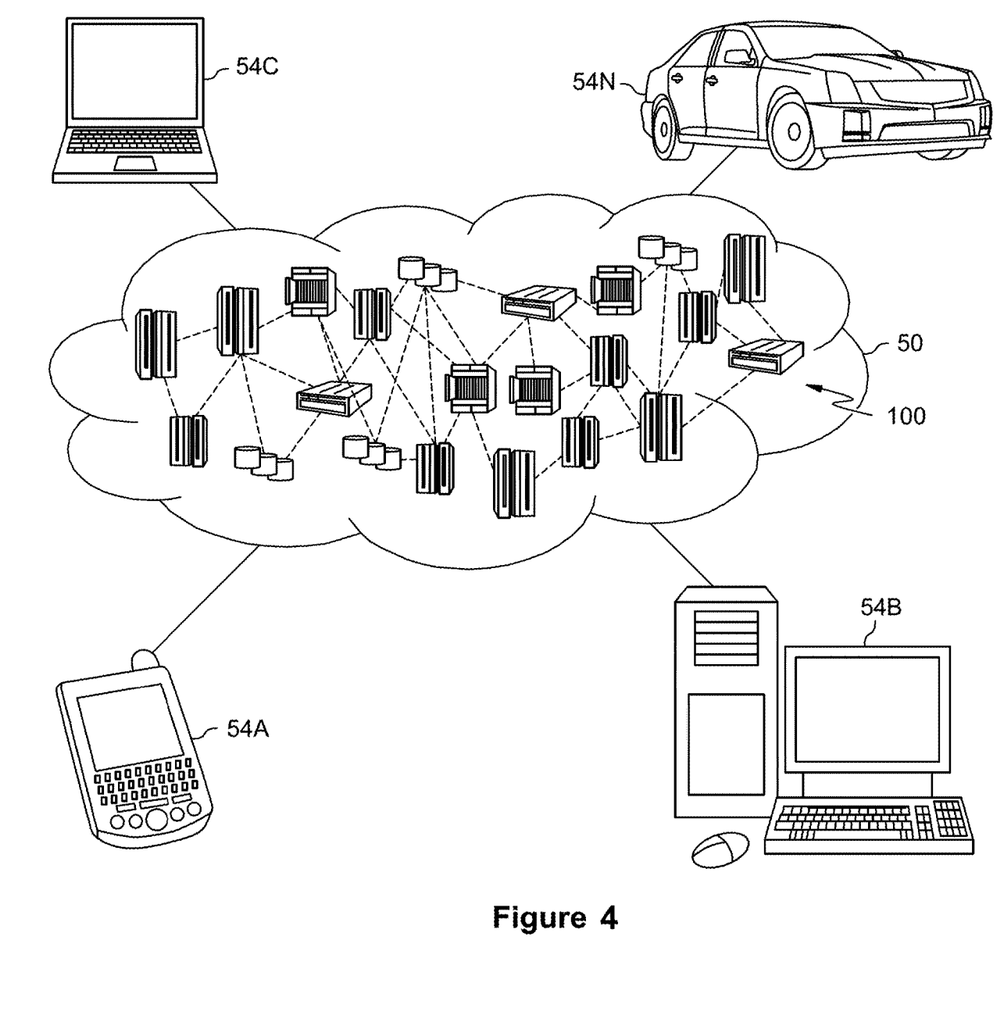
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
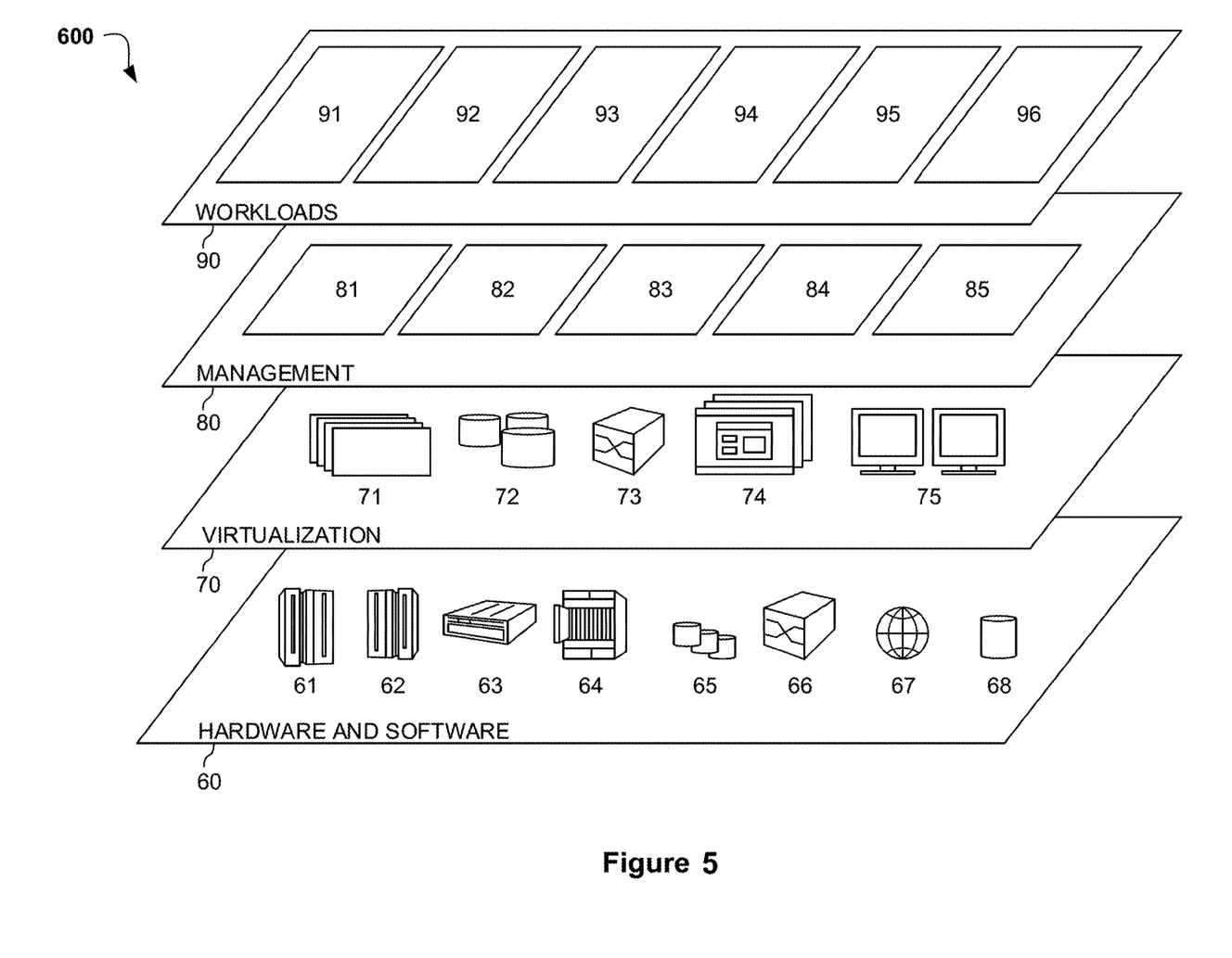
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tag provisioning 96. Tag provisioning 96 may relate to recommending a tag schema for cloud assets based on analysis of an existing ecosystem of tags having tag-keys and tag-values.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of provisioning a tag schema, the method comprising:
    determining data types for tag-keys within an existing ecosystem of tags, wherein each tag of the existing ecosystem comprises a tag-key and a tag-value;
    performing pairwise clustering of the tags within the ecosystem;
    calculating an efficacy score for each tag-key within the cluster;
    identifying a main tag-key within each cluster of tags by selecting the tag-key within the cluster having a highest efficacy score as the main tag-key within the cluster;
    grouping the clusters into a broader category; and
    providing a tag schema recommendation for the ecosystem based on the grouped clusters.

2. The method of claim 1, further comprising: applying natural language processing to both tag-keys and tag-values of the tags within the ecosystem prior to determining the data type for tag-keys.

3. The method of claim 1, wherein the pairwise clustering of tags within the ecosystem is based on a comparison of determined data types for tag-keys, an assessment of tag-key similarity using fuzzy matching, an evaluation of patterns of tag-values used across assets, and an assessment of tag-value similarity using fuzzy matching or another function.

4. The method of claim 1, wherein identifying the main tag- key within each cluster of tags further comprises:
    identifying one or more alias tag-keys within each cluster of tags;
    calculating an efficacy score for each tag-key within the cluster; and
    ranking tag-keys within the cluster according to their respective efficacy scores, wherein the main tag-key has the highest efficacy score.

5. The method of claim 4, wherein an efficacy score for a tag-key is based on a percentage metric of tagged assets which have tag-value organized under the tag-key, a normalized entropy metric of the tag-key, and a count of how many unique tag-values organized under the tag-key.

6. The method of claim 1, wherein grouping the clusters into a broader category is based on industry specific domain knowledge, and wherein the broader category is one of a business category, a technical category, or a security category.

7. The method of claim 1, wherein the tag schema recommendation comprises a subset of tags whose tag-key efficacy score exceeds a threshold value.

8. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    determining data types for tag-keys within an existing ecosystem of tags, wherein each tag of the existing ecosystem comprises a tag-key and a tag-value;
    performing pairwise clustering of the tags within the ecosystem;

calculating an efficacy score for each tag-key within the cluster;

identifying a main tag-key within each cluster of tags by selecting the tag-key within the cluster having a highest efficacy score as the main tag-key within the cluster;

grouping the clusters into a broader category; and providing a tag schema recommendation for the ecosystem based on the grouped clusters.

9. The computer system of claim 8, wherein identifying the main tag-key within each cluster of tags further comprises: identifying one or more alias tag-keys within each cluster of tags; calculating an efficacy score for each tag-key within the cluster;

and ranking tag-keys within the cluster according to their respective efficacy scores, wherein the main tag-key has the highest efficacy score.

10. The computer system of claim 9, wherein an efficacy score for a tag-key is based on a percentage metric of tagged assets which have tag-value organized under the tag-key, a normalized entropy metric of the tag-key, and a count of how many unique tag-values organized under the tag-key.

11. A computer program product, the computer program product comprising:

one or more computer-readable tangible storage medium and program instructions stored on at least one of the one or more tangible storage medium, the program instructions executable by a processor capable of performing a method, the method comprising:

determining data types for tag-keys within an existing ecosystem of tags, wherein each tag of the existing ecosystem comprises a tag-key and a tag-value;

performing pairwise clustering of the tags within the ecosystem; identifying a main tag-key within each cluster of tags;

grouping the clusters into a broader category; and providing a tag schema recommendation for the ecosystem based on the grouped clusters wherein identifying a main tag-key within each cluster of tags further comprises:

identifying one or more alias tag-keys within each cluster of tags; and calculating an efficacy score for each tag-key within the cluster; and ranking tag-keys within the cluster according to their respective efficacy scores, wherein the main tag-key has the highest efficacy score.

12. The computer program product of claim 11, wherein the pairwise clustering of tags within the ecosystem is based on a comparison of determined data types for tag-keys, an assessment of tag-key similarity using fuzzy matching, an evaluation of patterns of tag-values used across assets, and an assessment of tag-value similarity using fuzzy matching or another function.

13. The method of claim 1, wherein the identifying the main tag- key within each cluster of tags includes identifying a first main tag-key for a first cluster of tags and identifying a second main tag-key for a second cluster of tags, the second main tag-key being different than the first main tag-key.

14. The method of claim 1, wherein identifying a main tag-key within each cluster of tags includes determining an efficacy score for respective tag-keys within the cluster.

15. The method of claim 1, wherein identifying a main tag-key within each cluster of tags further comprises identifying one or more alias tag-keys within each cluster of tags.

16. The method of claim 1, wherein identifying a main tag-key within each cluster of tags includes using efficacy scoring for scoring respective tag-keys within the cluster.

17. The method of claim 1, wherein identifying a main tag-key within each cluster of tags includes assigning efficacy scores to respective tag-keys within the cluster, and selecting the main tag-key from the respective tag-keys in dependence on the assigning.

18. The method of claim 1, wherein the grouping the clusters into the broader category includes grouping a first cluster having a first main tag-key and a second cluster having a second main-tag key into the broader cluster, wherein the second main tag-key is different than the first main tag-key.

* * * * *